United States Patent
De Lind Van Wijngaarden et al.

(10) Patent No.: US 8,122,330 B2
(45) Date of Patent: Feb. 21, 2012

(54) RATE-ADAPTIVE FORWARD ERROR CORRECTION FOR OPTICAL TRANSPORT SYSTEMS

(75) Inventors: Adriaan J. De Lind Van Wijngaarden, New Providence, NJ (US); Randy C. Giles, Whippany, NJ (US); Steven K. Korotky, Toms River, NJ (US); Xiang Liu, Marlboro, NJ (US)

(73) Assignee: Alcatel Lucent, Paris (FR)

( * ) Notice: Subject to any disclaimer, the term of this patent is extended or adjusted under 35 U.S.C. 154(b) by 1233 days.

(21) Appl. No.: 11/834,169

(22) Filed: Aug. 6, 2007

(65) Prior Publication Data

US 2009/0044079 A1    Feb. 12, 2009

(51) Int. Cl.
*H03M 13/03*    (2006.01)
(52) U.S. Cl. .................. 714/787; 714/774; 714/788
(58) Field of Classification Search .............. 370/392; 714/774, 704, 780, 756, 752, 787, 788
See application file for complete search history.

(56) References Cited

U.S. PATENT DOCUMENTS

| | | | | |
|---|---|---|---|---|
| 6,643,817 B2* | 11/2003 | Baggen | .......... | 714/774 |
| 6,829,741 B1 | 12/2004 | Khansari et al. | | |
| 6,892,342 B2 | 5/2005 | Eroz et al. | | |
| 7,181,657 B2* | 2/2007 | Soga et al. | .......... | 714/704 |
| 7,428,669 B2* | 9/2008 | Cioffi | .......... | 714/704 |
| 7,570,643 B2* | 8/2009 | Prasad et al. | .......... | 370/392 |
| 7,661,038 B2* | 2/2010 | Li et al. | .......... | 714/704 |
| 7,757,155 B2* | 7/2010 | Lim et al. | .......... | 714/780 |
| 7,809,996 B2* | 10/2010 | Cioffi | .......... | 714/704 |
| 2007/0022362 A1 | 1/2007 | Yue et al. | | |
| 2007/0113147 A1 | 5/2007 | Hong et al. | | |

FOREIGN PATENT DOCUMENTS

EP    1 278 325 A2    1/2003

OTHER PUBLICATIONS

"Performance Fluctuations in Submarine WDM Systems" by Alexei N. Pilipetskii et al., Journal of Lightwave Technology, vol. 24, No. 11, Nov. 2006, XP11150145, pp. 4208-4214.

"Forward Error Correction Techniques in Long Haul Optical Transmission Systems" by H. D. Kidorf et al., LEOS 2001, 14th Annual Meeting of the IEEE Lasers & Electro-Optics Society, Nov. 11-15, 2001, vol. 2, XP010566531, pp. 477-478.

"Impact of Fiber Aging and Cable Repair in an Installed 28-nm Transatlantic 96×10 Gb/s DWDM System" by B. Bakhshi et al., Optical Fiber Communication Conference, Technical Digest, OFC/NF OEC, vol. 1, Mar. 6-11, 2005, XP010831088, pp. 169-171.

(Continued)

*Primary Examiner* — David Ton
(74) *Attorney, Agent, or Firm* — Mendelsohn, Drucker & Associates, P.C.; Yuri Gruzdkov; Steve Mendelsohn

(57) ABSTRACT

An optical transport system (OTS) having a plurality of optical transponders (OTs) connected via one or more optical links and adapted to communicate with one another using respective rate-adaptive forward-error-correction (FEC) codes. In one embodiment, the OTS has a rate control unit (RCU) adapted to configure the OTs to dynamically adjust the rates of the FEC codes based on an estimated performance margin for each link between two respective communicating OTs to optimize the overall capacity of the OTS while maintaining an adequate, but not excessive, overall system margin.

24 Claims, 4 Drawing Sheets

OTHER PUBLICATIONS

"Implementation of Soliton Transmission in Long-Haul Submarine Communication Systems" by P. R. Morkel et al., Jan. 1, 1994, XP006527627, pp. 5/1-5/6.

"Enhanced PMD Mitigation Using Forward-Error-Correction Coding and a First-Order Compensator" by Y. Xie et al., Optical Fiber Communication Conference (OFC), Technical Digest Postconference Edition, vol. 3, Mar. 17-22, 2001, XP010546447, pp. WAA2-1-WAA2-3.

"Rate-Compatible Punctured Convolutional Codes (RCPC Codes) and Their Applications," J. Hagenauer, Apr. 1988, IEEE Trans. Commun., vol. 36, No. 4, pp. 389-400.

"On Construction of Rate-Compatible Low-Density Parity-Check Codes," by M. R. Yazdani and A. H. Banihashemi, Mar. 2004, IEEE Commun. Letters, vol. 8, No. 3, pp. 159-161.

"Generation of Rate-Compatible LDPC Codes Based on Linear Transformation," by N. Chen, Y. Chang, and D. Yang, Communications and Electronics, ICCE—First International Conference, Oct. 2006, pp. 311-314.

"Spectral efficiency of coded phase-shift keying for fiber-optic communication," by G. Kramer, A. Ashikhmin, A. J. van Wijngaarden, and X. Wei, J. Lightwave Technol., 2003, vol. 21, pp. 2438-2445.

* cited by examiner

100

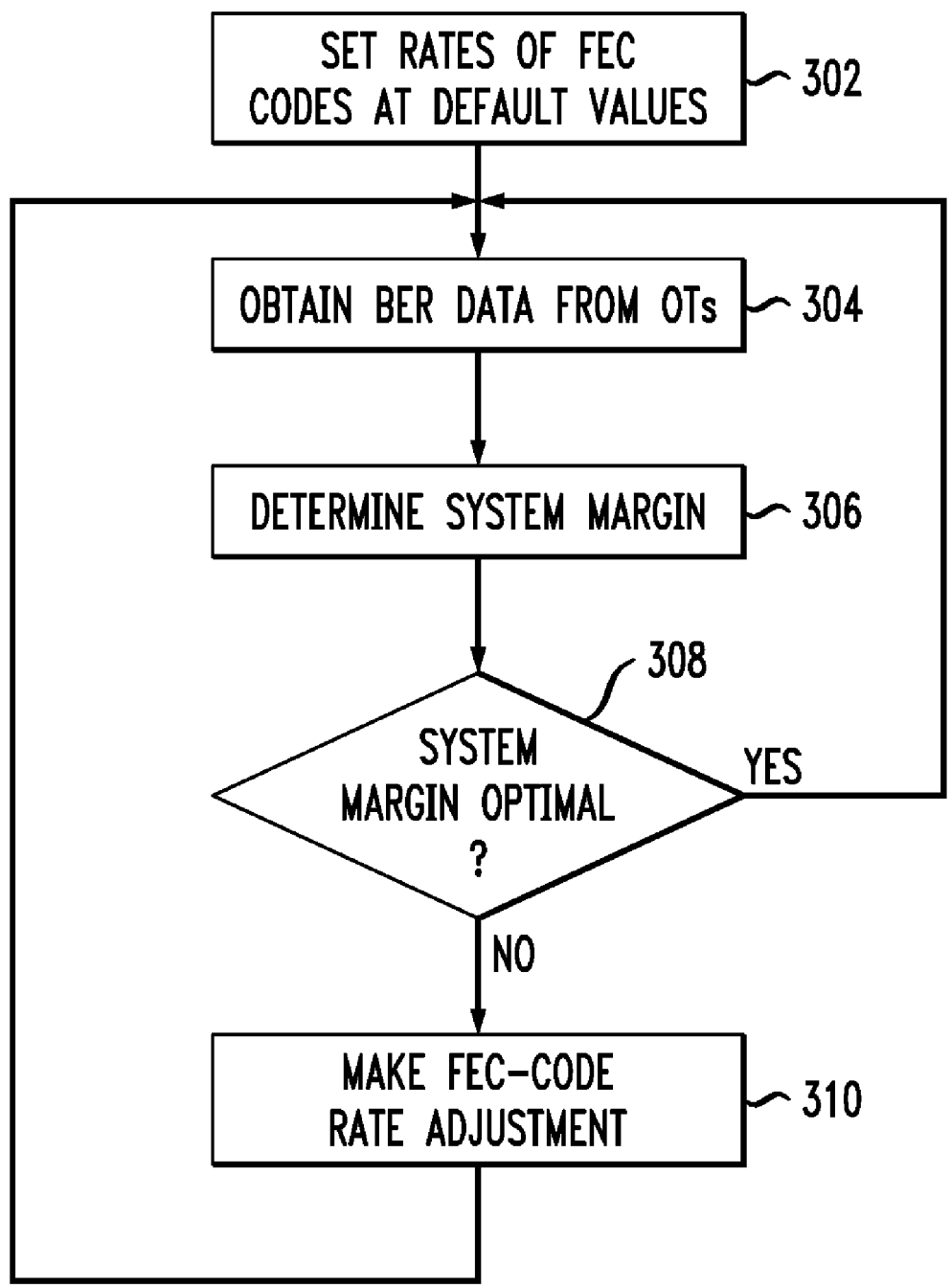

RATE-ADAPTIVE FORWARD ERROR CORRECTION FOR OPTICAL TRANSPORT SYSTEMS

BACKGROUND OF THE INVENTION

1. Field of the Invention

The present invention relates to optical transport systems (OTSs) and, more specifically, to improving capacity and/or cost effectiveness of an OTS during its lifespan through utilization of rate-adaptive forward error correction (FEC).

2. Description of the Related Art

In current optical transport systems (OTSs), wavelength division multiplexing (WDM) is widely used to provide adequate data-transmission capacity. The data rate of the optical signal, termed herein the "optical signal rate," of each WDM channel is usually specified to 2.5, 10, or 40 Gb/s according to the synchronous optical network (SONET) standard and based on the projected traffic demand and optical-link conditions. Once set at the system deployment stage, the optical signal rates typically remain fixed throughout the lifespan of the OTS because changing the optical signal rates is either impossible or very expensive due to hardware and software changes.

To meet the specified quality of service (QoS) requirements, each WDM channel is generally required to guarantee a relatively low output bit error rate (BER), typically of the order of $10^{-16}$. Since the QoS requirements are expected to be met during the entire life of the OTS, a substantial initial performance margin is allocated to each WDM channel at the deployment stage in order to accommodate the subsequent loss of performance margin due to the aging of system components (e.g., optical transmitters, amplifiers, receivers, filters, and multiplexers/demultiplexers) and general degradation in the condition of the optical link. The performance margin is usually defined as the difference, in decibels (dB), between the actual signal quality (Q-factor) and the threshold Q-factor at which the system is considered to have just barely acceptable performance. The Q-factor (in dB) is related to the BER as follows:

$$BER = \frac{1}{2}\text{erfc}\left(\frac{10^{Q \text{ (dB)}/20}}{\sqrt{2}}\right) \quad (1)$$

For example, for a BER of $10^{-3}$, the Q-factor is 9.8 dB. Since the typical loss of the performance margin due to aging is about 4 dB over about 20 years (a typical lifespan specified by optical network/system operators), a current OTS is often configured to have an extra performance margin of about 4 dB at the beginning of life (BOL) of the system to guarantee reliable operation over its lifespan.

Furthermore, the performance margin for a given transmission link between two optical transponders (OTs) depends on the condition of the transmission link, such as the optical signal-to-noise-ratio (OSNR) after signal transmission, chromatic dispersion (CD) and polarization-mode dispersion (PMD) characteristics, WDM crosstalk, and optical filtering penalties. The OSNR after signal transmission further depends on signal attenuation in the optical fiber, signal power, and optical amplification. It is not unusual that, at a given time, different WDM channels have different performance margins. Because, based on demand, a given WDM channel can be re-routed to establish a different transmission link between two OTs and the signal wavelength can be tuned, the performance margin for the WDM channel can vary significantly (e.g., go up and down) over time. This variation may adversely affect the overall throughput of the OTS and/or require the initial extra performance margin to be further increased above the aging-accommodation value of about 4 dB.

SUMMARY OF THE INVENTION

A representative embodiment of the invention provides an optical transport system (OTS) having a plurality of optical transponders (OTs) connected via one or more optical links and adapted to communicate with one another using respective rate-adaptive forward-error-correction (FEC) codes. The OTS has a rate control unit (RCU) adapted to configure the OTs to dynamically adjust the rates of the FEC codes based on an estimated performance margin for each link between two respective communicating OTs to optimize the overall capacity of the OTS while maintaining an adequate, but not excessive, overall system margin. Advantageously, the extent of system-resource underutilization in an OTS of the invention is significantly reduced compared to that in a comparable prior-art OTS.

According to one embodiment, an optical transport system of the invention comprises: (A) a plurality of optical transponders (OTs) connected via one or more optical links and (B) a rate control unit (RCU). At least first and second OTs of said plurality are adapted to communicate with one another using a rate-adaptive forward-error-correction (FEC) code. The RCU is adapted to (i) estimate a performance margin for an optical link between the first and second OTs and (ii) configure the first and second OTs to change a rate of the FEC code based on the estimated performance margin.

According to another embodiment, a method of operating an optical transport system of the invention comprises the steps of: (A) estimating a performance margin for an optical link between at least first and second optical transponders (OTs) of a plurality of OTs connected via one or more optical links, wherein the first and second OTs are adapted to communicate with one another using a rate-adaptive forward-error-correction (FEC) code; and (B) configuring the first and second OTs to change a rate of the FEC code based on the estimated performance margin.

BRIEF DESCRIPTION OF THE DRAWINGS

Other aspects, features, and benefits of the present invention will become more fully apparent from the following detailed description, the appended claims, and the accompanying drawings in which:

FIG. 3 shows a flowchart of a method of operating the OTS of FIG. 1 according to one embodiment of the invention.

DETAILED DESCRIPTION

Figure 1:
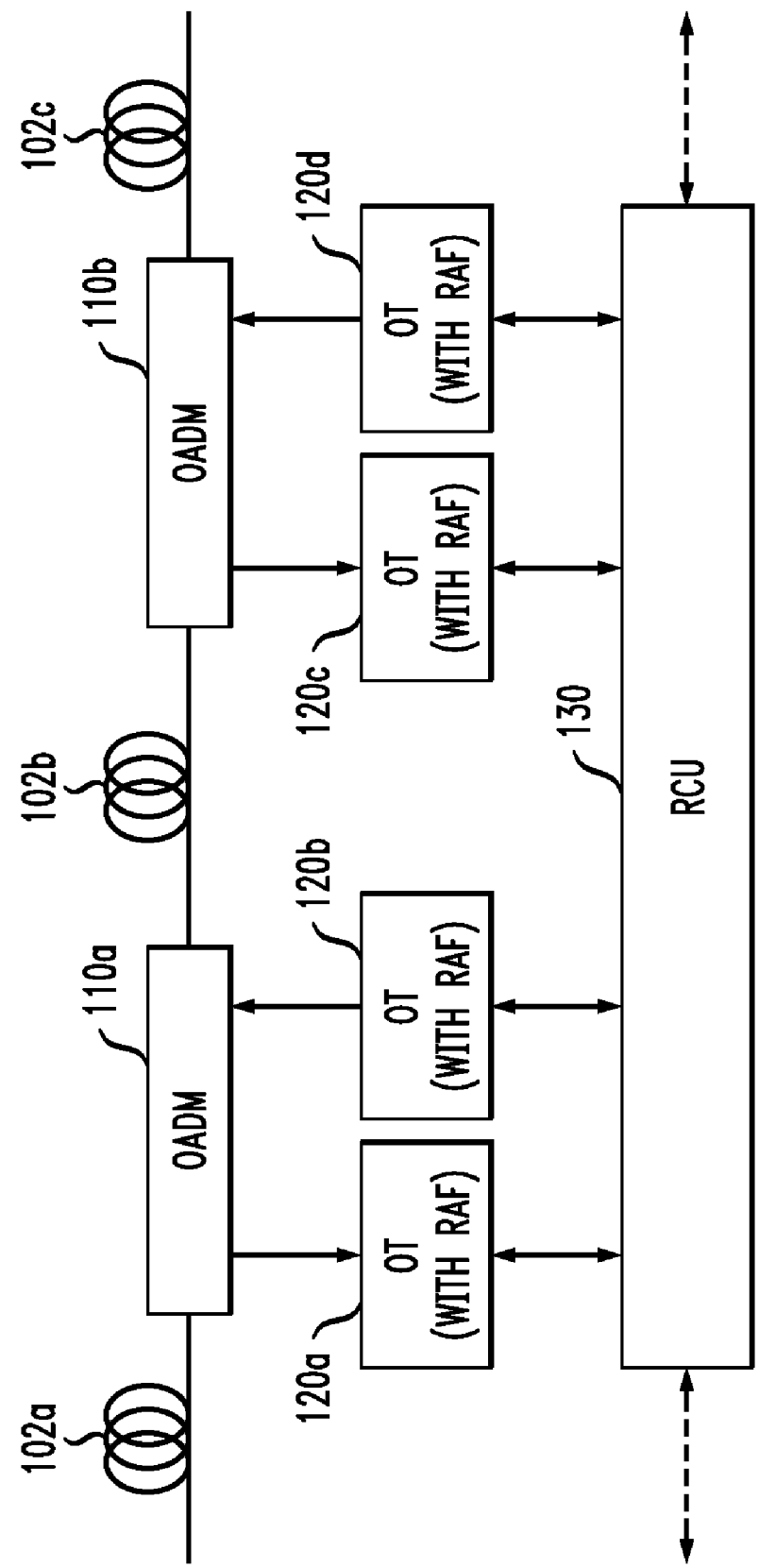
FIG. 1 shows a block diagram of an optical transport system (OTS) according to one embodiment of the invention.

In general, the noise associated with a communication channel can cause errors at the receiver. Forward error correction (FEC) techniques, such as those employing RS (Reed-Solomon) and BCH (Bose-Chaudhuri-Hocquenghem) codes, improve reliability of the optical channel by adding redundancy to the data, which is used at the receiver to detect and correct errors. Usually, more redundancy enables more reliable communications, but at the cost of consuming additional bandwidth or lowering the throughput.

An FEC code is characterized by an FEC-code rate, Rc, defined as a ratio of the number of original information bits k to the total number of transmitted bits n, the latter number including both the information bits and redundant bits, i.e., $R_C=k/n$. An FEC-code rate can also be characterized in terms of an FEC-overhead rate, $R_O$, defined as the ratio of the number of redundant bits to the number of original information bits in an FEC frame, i.e., $R_O=(n-k)/k$. The relationship between the FEC-code rate and the FEC-overhead rate is given by the following equation: $R_C=(1+R_O)^{-1}$.

A major benefit of using FEC is that the performance margin of a signal channel can be increased significantly. For example, a typical RS FEC code with a 7% overhead can reduce the BER from about $6 \times 10^{-5}$ before correction to less than about $10^{-16}$ after the correction, thereby effectively increasing the performance margin by about 6.5 dB. Similarly, a low-density parity-check (LDPC) FEC code with a 7% overhead can reduce the BER from about $1 \times 10^{-3}$ before correction to less than about $10^{-16}$ after the correction, thereby increasing the performance margin by about 8.5 dB. It is feasible to further increase the performance margin of an FEC code based on the use of soft-decoding or other suitable advanced decoding techniques. The increased performance margin provided by FEC is often referred to as the "coding gain." Representative LDPC FEC codes are described in the following publications: (1) U.S. Patent Application Publication No. 2007/0113147; (2) J. Hagenauer, "Rate-Compatible Punctured Convolutional Codes (RCPC Codes) and Their Applications," IEEE Trans. Commun., vol. 36, no. 4, pp. 389-400, April 1988; (3) M. R. Yazdani and A. H. Banihashemi, "On Construction of Rate-Compatible Low-Density Parity-Check Codes," IEEE Commun. Letters, vol. 8, no. 3, pp. 159-161, March 2004; and (4) N. Chen, Y. Chang, and D. Yang, "Generation of Rate-Compatible LDPC Codes Based on Linear Transformation," Communications and Electronics, ICCE—First International Conference, October 2006, pp. 311-314, the teachings of all of which are incorporated herein by reference.

In optical communications, FEC is used, for example, in (i) long-haul OTSs to reduce the number of 3R (re-time, re-shape, re-transmit) regenerators and (ii) wavelength division multiplexing (WDM) systems to increase the data rates of individual WDM channels. The use of FEC codes in synchronous optical network (SONET) systems and synchronous digital hierarchy (SDH) systems is disclosed, e.g., in U.S. Pat. No. 6,829,741, the teachings of which are incorporated herein by reference. The use of RS and LDPC FEC codes for transmission of on-off-keyed (OOK) and differential phase-shift keyed (DPSK) optical signals is disclosed, e.g., in an article by G. Kramer, A. Ashikhmin, A. J. van Wijngaarden, and X. Wei, "Spectral efficiency of coded phase-shift keying for fiber-optic communication," J. Lightwave Technol., 2003, vol. 21, pp. 2438-2445, the teachings of which are incorporated herein by reference.

Suppose that the BER after FEC decoding (hereafter termed "corrected BER") that is specified as acceptable for an optical transport system (OTS) is $10^{-16}$, meaning that, on average, one bit error is considered tolerable per $10^{16}$ decoded information bits. This further means that the probability of an error event is even lower than that, because the output of an FEC code typically gives multiple errors if the error correcting capabilities of the code are exceeded. At deployment, a prior-art OTS employing an RS FEC code might be configured to have a BER before correction of at least about $10^{-9}$ to provide an extra performance margin of about 4 dB over the corresponding BER threshold of $6 \times 10^{-5}$ to accommodate the performance-margin loss due to system aging. However, one problem with the prior-art approach to FEC in OTSs is that, at the beginning of life (BOL), the performance margin is usually excessively high. Having an excessively high performance margin means that some of the system's potential in terms of the overall throughput or cost-effectiveness remains unutilized for a substantial period of time, which is usually undesirable to the network operator.

Problems in the prior art are addressed by providing an OTS in which an FEC coding gain can be adjusted as needed over the lifespan of the OTS to maintain a performance margin that is sufficient but not excessive for the current condition of the OTS. For example, at the BOL of an OTS, a relatively high FEC-code rate (relatively small FEC overhead rate) can be used to provide just enough coding gain for the OTS to have an adequate performance margin. As the OTS ages, the FEC-code rate can be lowered (the FEC overhead rate can be raised) to provide more coding gain and compensate for the loss of performance margin. Also, FEC rate adjustments can be made during a reconfiguration of the OTS to accommodate changes in the condition of the transmission link. One important attribute of this approach is that the optical signal rate for a given WDM channel remains fixed, e.g., at 10 or 40 Gb/s, so that no hardware changes, e.g., in the clock and data recovery (CDR) circuitry, are needed, and the effects of transmission impediments, such as chromatic dispersion, polarization-mode dispersion, fiber nonlinearity, and optical filtering, remain unaffected by the code-rate adjustments. With this approach, the OTS can advantageously maintain an adequate, but not excessive, performance margin throughout its entire lifespan and possible network reconfigurations. Although the effective system data-transmission capacity might be somewhat reduced after each upward adjustment of the FEC-code rate, the overall system throughput (or capacity) and the extent of system-resource utilization are significantly higher in an OTS of the invention than those in a comparable prior-art OTS.

FIG. 1 shows a block diagram of an OTS 100 according to one embodiment of the invention. OTS 100 is connected to an external optical transport network via optical links (e.g., optical fibers) 102a and 102c and is illustratively shown as having optical add-drop multiplexers (OADMs) 110a-b connected to one another via an optical link (e.g., an optical fiber) 102b. Each OADM 110 can add and/or drop optical signals originating from and/or directed to the respective optical transponders (OTs) 120. For example, OTs 120a,c are configured to receive optical signals dropped by OADMs 110a-b, respectively, from a WDM multiplex transported by OTS 100. Similarly, OTs 120b,d are configured to generate optical signals for addition through OADMs 110a-b, respectively, to the WDM multiplex.

Each of OTs 120a-d is adapted to use rate-adaptive FEC (RAF). More specifically, for at least one WDM channel, OT 120 utilizes an FEC code whose rate $R_C$ can be adjusted as needed, while the optical signal rate remains fixed (unchanged). In one embodiment, OT 120 is configured to use a rate-compatible RS FEC code, whose rate $R_C$ can be set to any of the following values: 15/16, 7/8, 3/4, and 1/2, which translates into gross coding gains of about 6.2, 7.6, 8.9, and 10.2 dB, respectively. In another embodiment, OT 120 is configured to use an LDPC FEC code, whose rate $R_C$ is selectable from the following values: 15/16, 7/8, 3/4, 1/2, and 3/8, for obtaining gross coding gains of about 8, 9, 10.5, 12, and 13.5 dB, respectively.

The FEC-code rate used by each of OTs 120a-d is controlled by a rate control unit (RCU) 130. In one embodiment, by running an FEC code and detecting and correcting errors, an OT 120 is able to provide BER information to RCU 130. By collecting and analyzing BER information from various OTs 120, RCU 130 is able to determine the present performance margin for each optical link and/or WDM channel. If RCU 130 determines that the present performance margin is adequate, then no action is taken by the RCU. However, if RCU 130 determines that the present performance margin has fallen below a predetermined threshold value, then the RCU configures the appropriate ones of OTs 120 to change their respective FEC-code rates. Preferably, RCU 130 is adapted to select the highest possible rate of the FEC code that provides an acceptable performance margin for the transmission link between the two communicating OTs. For example, RCU 130 might configure an OT 120 running an LDPC FEC code with rate $R_C = {}^{15}/_{16}$ to change its $R_C$ value to ⅞ when an estimated performance shortfall of less than 1 dB is expected. The resulting change in the gross coding gain translates into an increase in the performance margin of about 1 dB, which might be sufficient to overcome the shortfall.

In another embodiment, RCU 130 can perform FEC-code-rate adjustments based on a predicted performance margin for each of the WDM channels between two communicating OTs. The predicted performance margin can be deduced from the conditions of the optical transmission link between the two communicating OTs. These conditions are described by a plurality of parameters, such as the length of the link, the optical signal-to-noise-ratio (OSNR) after transmission over the link, the wavelength of the optical signal being transmitted and received by the two communicating OTs, chromatic dispersion (CD) and polarization-mode dispersion (PMD) characteristics, WDM crosstalk, fiber nonlinear penalty, the optical filtering penalty, and the number of years in service for each of the OTs. Note however that different WDM channels need not have equal FEC-code rates.

In one embodiment, RCU 130 is further adapted to configure two communicating OTs to partition the original information data into data tributaries that are compatible with the synchronous optical network (SONET) standard. More specifically, the partitioned data tributaries can have information rates of about 40 Gb/s (OC768), 10 Gb/s (OC192), 2.5 Gb/s (OC48), 622 Mb/s (OC12), and 155 Mb/s (OC3). Table 1 shows exemplary partitions of 42.7-Gb/s and 10.7-Gb/s optical signals into SONET-compatible data tributaries at different FEC rates. Note that "dummy" data might have to be added to the information data and redundant FEC data to fill up the slots that still remain available due to the fact that the SONET optical signal has a fixed overall data rate.

In another embodiment, RCU 130 is further adapted to configure two communicating OTs to partition the original information data into data tributaries that are compatible with the Ethernet standard. For example, data rates of 10 Gb/s, 1 Gb/s, 100 Mb/s, and 10 Mb/s are compatible with the Ethernet standard (see IEEE Standard 802.3).

Unlike in wireless networks, where rate-compatible codes are generally used in conjunction with automatic repeat requests (ARQs) and redundant bits are transmitted based on demand, OTS 100 is preferably configured to always transmit redundant bits together with information bits. One important reason for this preference is that, in optical transport networks, the distance between a transmitter and a corresponding receiver can be very large, e.g., longer than 100 km, and often on the order of 1,000 km, or even longer than that. Consequently, the latency associated with an ARQ and retransmission of redundant bits could be disadvantageously large. To avoid this latency, none of OTs 120 is configured to use an ARQ. Instead, RCU 130 continuously communicates with OTs 120 to be able to adjust the FEC-code rates as needed based on the BER information, optical link condition, and traffic demands. In addition, as discussed above, an FEC rate adjustment may be needed during a reconfiguration of the transmission link between two communicating OTs, and the desired rate may be "predetermined" based on the predicted link conditions and traffic demand. In that case, RCU 130 may be configured to adjust FEC-code rates without relying on the current BER information from the OTs.

Figure 2:
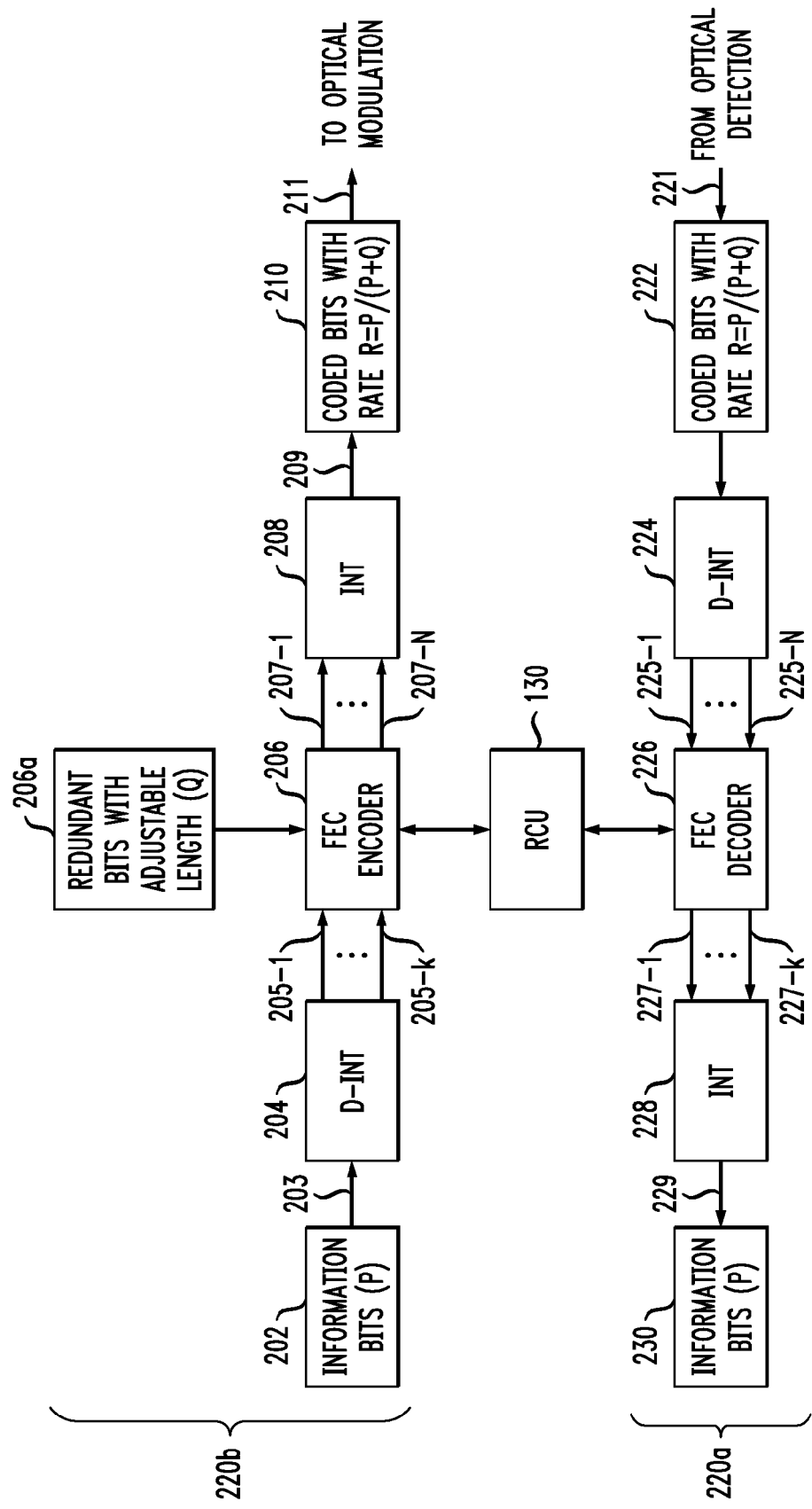
FIG. 2 shows block diagrams of transmitter and receiver data processors that can be used in the optical transponders of the OTS shown in FIG. 1 according to one embodiment of the invention.

FIG. 2 shows block diagrams of a receiver data processor (RDP) 220a and a transmitter data processor (TDP) 220b that can be used, e.g., in OTs 120, according to one embodiment of the invention. RDP 220a has an optical detector (not explicitly shown in FIG. 2) adapted to convert optical signals, e.g., received via a communication link, into the corresponding electrical signals of a bit stream 221. Bit stream 221 carries both information bits and redundant bits in a proportion defined by the FEC code employed at the transmitter. For example, for an FEC code of rate $R_C = p/(p+q)$, where p and q are positive integers, bit stream 221 contains q redundant bits per p information bits. The bits supplied by bit stream 221 are buffered in a buffer 222 and de-interleaved in a de-interleaver (D-INT) 224 to generate a plurality of bit streams 225-1 through 225-N, each having an N-times lower bit rate than bit stream 221. An FEC decoder 226 receives bit streams 225 and applies an FEC decoding algorithm that matches the FEC encoding algorithm used at the transmitter. The output of the decoding algorithm is a plurality of bit streams 227-1 through 227-k that carry the recovered information bits. Depending on the particular FEC encoding algorithm, N may be different from or the same as k. Bit streams 227 are appropriately interleaved in an interleaver (INT) 228 to generate a bit stream 229 corresponding to the original information-bit stream applied to the transmitter by remote clients. Bit stream 229 is stored in a buffer 230, e.g., for further distribution to local clients. Note that further partitioning of information bit stream 229 to SONET-compatible data tributaries according

TABLE 1

Exemplary partition of optical signal data into SONET-compatible data tributaries

| | $R_C = {}^{15}/_{16}$ | $R_C = {}^{7}/_{8}$ | $R_C = {}^{3}/_{4}$ | $R_C = {}^{5}/_{8}$ | $R_C = {}^{1}/_{2}$ | $R_C = {}^{3}/_{8}$ | $R_C = {}^{1}/_{4}$ |
|---|---|---|---|---|---|---|---|
| 42.7-Gb/s | 1 × OC768 | 3 × OC192<br>2 × OC48<br>3 × OC12 | 3 × OC192<br>3 × OC12 | 2 × OC192<br>2 × OC48<br>2 × OC12 | 2 × OC192<br>2 × OC12 | 1 × OC192<br>2 × OC48<br>1 × OC12 | 1 × OC192<br>1 × OC12 |
| 10.7-Gb/s | 1 × OC192 | 3 × OC48<br>2 × OC12<br>3 × OC3 | 3 × OC48<br>3 × OC3 | 2 × OC48<br>2 × OC12<br>2 × OC3 | 2 × OC48<br>2 × OC3 | 1 × OC48<br>2 × OC12<br>1 × OC3 | 1 × OC48<br>1 × OC3 | to the partition rules used in the transmitter may be applied. These partition rules depend on the FEC rate, and exemplary partitions are shown in Table 1.

TDP 220b has a buffer 202 that stores information bits intended for the transmission to a remote receiver having an RDP, such as RDP 220a. Buffer 202 applies the stored information bits, via a bit stream 203, to a de-interleaver (D-INT) 204, where that bit stream is appropriately de-interleaved to generate a plurality of bit streams 205-1 through 205-k. An FEC encoder 206 receives bit streams 205 and applies to them an FEC encoding algorithm to generate a plurality of bit streams 207-1 through 207-N that carry both the original information bits and redundant bits. For example, FEC encoder 206 may use an FEC code of rate $R_C=p/(p+q)$ to generate q redundant bits per p information bits (see block 206a). Bit streams 207 are interleaved in an interleaver (INT) 208 to generate an interleaved bit stream 209 corresponding to bit streams 207. The FEC-encoded bits of bit stream 209 are buffered in an output buffer 210 and applied, via an output bit stream 211, to an optical modulator (not explicitly shown in FIG. 2) that generates optical signals, e.g., representing a SONET frame, for transmission to the remote receiver.

RCU 130 controls the FEC-code rates used by encoder 206 and decoder 226. In a situation where data processors 220a-b are configured to communicate with each other, e.g., via optical link 102b, RCU 130 configures encoder 206 and decoder 226 to run complementary FEC encoding and decoding algorithms, respectively, having equal FEC-code rates. When a rate adjustment needs to be performed, RCU 130 configures both OTs 220a-b to adjust their FEC-code rates so that the complementary nature of the FEC encoding and decoding algorithms is preserved.

In one embodiment, encoder 206 and decoder 226 use rate-compatible codes, in which the codeword bits from higher FEC-rate codes are embedded into lower FEC-rate codes. One benefit of this approach is that a whole family of codes can be encoded and decoded using a common hardware implementation for the encoder and decoder. Rate-compatible codes can be implemented, e.g., through puncturing the redundant bits, extending the redundant bits, or by linear transforming the FEC parity-check matrices. Representative rate-compatible codes are described in the following publications: (1) U.S. Pat. No. 6,892,342 and (2) U.S. Patent Application Publication No. 2007/0022362, the teachings of both of which are incorporated herein by reference; and (3) the above-cited publications by Hagenauer; Yazdani, et al.; and Chen, et al.

FIG. 3 shows a flowchart of a method 300 of operating OTS 100 according to one embodiment of the invention. At step 302 of method 300, RCU 130 (see also FIGS. 1-2) configures various OTs 120 to use the respective initial (default) FEC-code rates. These initial rates can be based, e.g., on the OTS's topology, design, and optical-link budgets. Step 302 can be performed, for example, at initial deployment of OTS 100. At step 304, RCU 130 communicates with OTs 120 to obtain BER data for each optical link 102 and/or WDM channel. At step 306, RCU 130 processes the BER data collected at step 304 to determine the performance margin. This determination may include comparing the BER(s) with a target BER value.

At step 308, RCU 130 determines whether the performance margin is optimal. In one implementation, the term "optimal" means that the determined performance margin is neither excessive nor too low. In one implementation of step 308, the determined performance margin is compared with two threshold values, e.g., an upper threshold value and a lower threshold value, to determine whether the present performance margin falls within the interval defined by those two threshold values. The upper and lower threshold values are generally set based on overall system performance considerations, which may include, but are not limited to, system capacity, traffic demands, and/or encoding/decoding latency. For example, in one system configuration, the lower threshold value can be set at about 0.2 dB, and the upper threshold value can be set at about 1.6 dB. If it is determined at step 308 that the performance margin is within the desirable interval, then RCU 130 takes no action and the processing of method 300 returns back to step 304. However, if it is determined that the performance margin is outside of the desirable interval, then the processing of method 300 is directed to step 310.

At step 310, RCU 130 configures various OTs 120 to make appropriate FEC-code rate adjustment(s). The FEC-code rate adjustments may include an upward rate adjustment and/or a downward rate adjustment. More specifically, if it is determined that the performance margin is excessive, then an upward rate adjustment may be performed. An upward rate adjustment is likely to follow the initial deployment stage, when the default FEC-code rates prove to be too conservative. Also, when a scheduled network reconfiguration is predicted to increase the performance margin of a WDM channel connecting two communicating OTs, RCU 130 may have the requisite knowledge and specify a new FEC rate via an appropriate upward rate adjustment to achieve the optimal performance margin. In one embodiment, step 310 selects the highest possible rate of the FEC code that provides an acceptable performance margin for the transmission link between the communicating OTs.

If it is determined that the performance margin is too low, then a downward rate adjustment is performed. As already indicated above, multiple downward rate adjustments may be performed during the lifespan of OTS 100 due to the aging of system components and general deterioration in the condition of optical links. Also, when a scheduled network reconfiguration is predicted to reduce the performance margin of a WDM channel, RCU 130 may have the requisite knowledge and specify a new FEC rate via an appropriate downward rate adjustment to achieve the optimal performance margin. After step 310, the processing of method 300 is directed back to step 304. Note that in method 300, RCU 130 may in parallel dynamically optimize the FEC rates for multiple WDM channels.

Figure 4A:
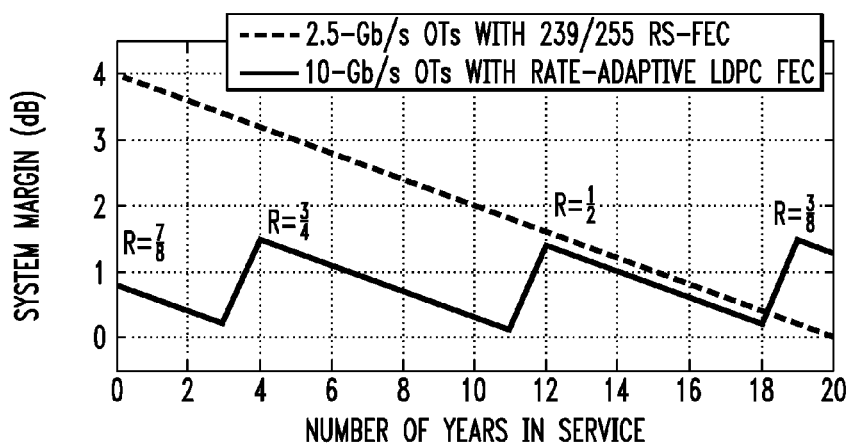
FIGS. 4A-C graphically compare representative characteristics of a prior-art OTS and an embodiment of the OTS shown in FIG. 1.
Figure 4B:
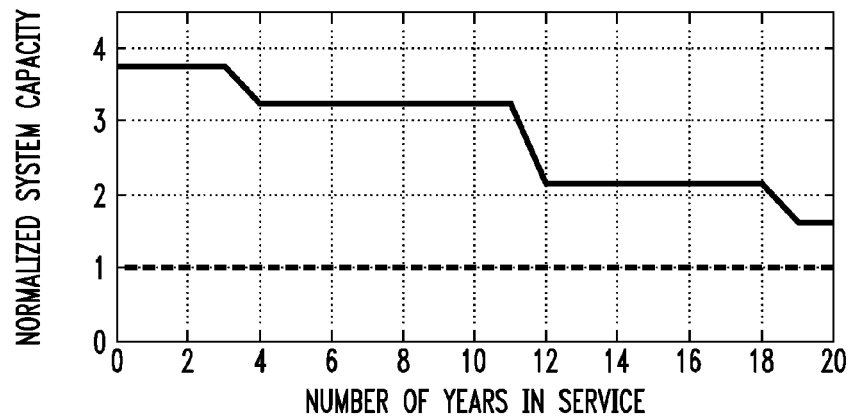
Figure 4C:
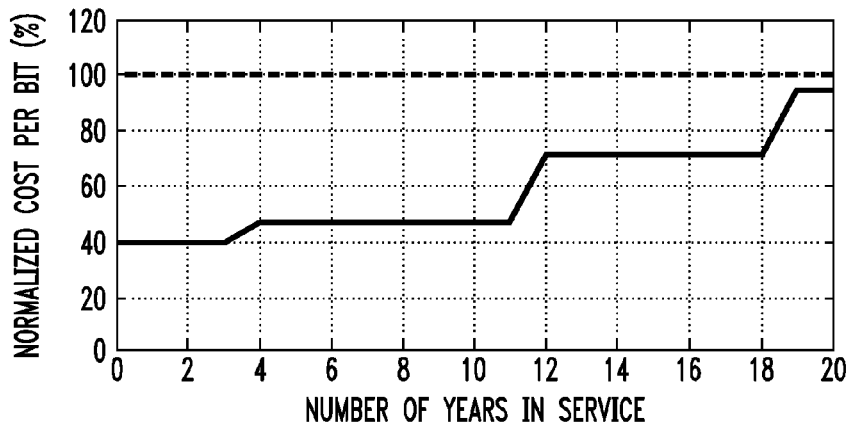

FIGS. 4A-C graphically compare representative characteristics of a prior-art OTS and an embodiment of OTS 100, hereafter referred to as OTS 400. More specifically, in each of FIGS. 4A-C, the respective characteristics of the prior-art OTS and OTS 400 are shown by dashed and solid lines, respectively. The prior-art OTS has a plurality of 2.5-Gb/s OTs that run an RS FEC code having a fixed rate ($R_C$) of $239/255$. OTS 400 has a plurality of 10-Gb/s OTs that run a rate-adaptive LDPC FEC code. The 2.5-Gb/s optical signal rate in the prior-art system is lower than the 10-Gb/s optical signal rate in OTS 400 because the prior-art OTS is not able to attain the required initial performance margin of about 4 dB using 10-Gb/s OTs.

FIG. 4A depicts, for both OTSs, the performance margin as a function of time (years in service). Note that the time resolution in FIG. 4A (and also in FIGS. 4B-C) is one year. In the prior-art OTS, the performance margin decreases linearly with time from about 4 dB at the BOL to about 0 dB at the end of life (EOL), which is 20 years from the BOL. In OTS 400, the FEC-code rate is set to $R_C=7/8$ at the BOL, which provides a performance margin of about 0.8 dB. The performance margin decreases linearly with time until, sometime during the fourth year, it crosses the lower threshold value specified to be about 0.2 dB. At that point, the FEC-code rate is adjusted downward to $R_C=3/4$ in accordance with method 300 (see FIG. 3). This rate adjustment increases the performance margin to about 1.6 dB. The performance margin decreases linearly thereafter until, sometime during the twelfth year, it crosses the lower threshold value again. At that point, the FEC-code rate is further adjusted downward to $R_C=1/2$ in accordance with method 300. The latter rate adjustment increases the performance margin to about 1.4 dB. The performance margin decreases linearly thereafter until, sometime during the nineteenth year, it crosses the lower threshold value one more time. At that point, the FEC-code rate is adjusted still further downward to $R_C=3/8$ in accordance with method 300. This rate adjustment brings the performance margin back up to about 1.6 dB. The performance margin decreases linearly thereafter until the OTS is taken out of service at the EOL.

FIG. 4B depicts, for both OTSs, the normalized system capacity as a function of time. As used herein, the term "system capacity" refers to the system capacity or throughput for the transport of information bits. In the prior-art OTS, the system capacity remains fixed from the BOL to the EOL. In OTS 400, the system capacity is about 3.7, 3.2, 2.1, and 1.6 times that of the prior-art system before the first, second, and third and after the third rate adjustments, respectively. Advantageously, OTS 400 provides on average about 2.5 times more system capacity than the prior-art OTS.

FIG. 4C depicts, for both OTSs, the normalized cost per information bit as a function of time. For FIG. 4C, it is assumed that, in both OTSs, the optical-link cost is the same and constitutes 75% of the overall cost of the prior-art OTS. The cost of the 2.5-Gb/s OTs constitutes the remaining 25% of the cost of the prior-art OTS, and the 10-Gb/s OTs used in OTS 400 are assumed to be three times more expensive than the 2.5-Gb/s OTs. Advantageously, the cost per bit in OTS 400 is on average about 40% less than the cost per bit in the prior-art OTS.

While this invention has been described with reference to illustrative embodiments, this description is not intended to be construed in a limiting sense. Although embodiments of the invention have been described in reference to RS and LDPC FEC codes, the invention is not so limited. One skilled in the art will understand that other suitable FEC codes, such as concatenated codes, convolutional codes, codes with hard-decision decoding, and codes with soft-decision decoding, can also be used. Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

What is claimed is:

1. An optical transport system, comprising:
a plurality of optical transponders (OTs) connected via one or more optical links; and
a rate control unit (RCU), wherein:
at least first and second OTs of said plurality are adapted to communicate with one another using a rate-adaptive forward-error-correction (FEC) code; and
the RCU is adapted to (i) estimate a performance margin for an optical link between the first and second OTs and (ii) configure the first and second OTs to change a rate of the FEC code based on the estimated performance margin.

2. The invention of claim 1, wherein the RCU is further adapted to (i) determine a bit-error rate (BER) for at least one of the first and second OTs and (ii) compare the determined BER with a target BER to estimate the performance margin.

3. The invention of claim 1, wherein:
the RCU is further adapted to predict the performance margin based on one or more optical characteristics of the optical link between the first and second OTs.

4. The invention of claim 3, wherein the one or more optical characteristics include one or more of:
optical signal-to-noise-ratio after signal transmission through the optical link, wavelength of an optical signal being transmitted through the optical link, amount of chromatic dispersion in the optical link, amount of polarization-mode dispersion in the optical link, optical-channel crosstalk in the optical link, fiber nonlinear penalty in the optical link, and optical filtering penalty in the optical link.

5. The invention of claim 1, wherein the RCU is further adapted to configure the first and second OTs to partition original information data into data tributaries that are compatible with a synchronous optical network (SONET) standard.

6. The invention of claim 1, wherein the RCU is further adapted to configure the first and second OTs to partition original information data into data tributaries that are compatible with an Ethernet standard.

7. The invention of claim 1, wherein the first and second OTs are adapted to communicate with one another using an optical signal rate of at least about 10 Gb/s.

8. The invention of claim 1, wherein an optical signal rate for the communications between the first and second OTs is constant over a lifespan of the optical transport system and independent of the change in the rate of the FEC code.

9. The invention of claim 1, wherein the first and second OTs are separated by a distance of at least 100 km.

10. The invention of claim 1, wherein the FEC code comprises one or more of a low-density parity-check code, a Reed-Solomon code, a convolutional code, and a rate-compatible code.

11. The invention of claim 1, wherein the RCU is adapted to:
compare a present BER for the communications between the first and second OTs with a target BER to determine a present performance margin;
compare the present performance margin with at least a first threshold value; and
reduce the rate of the FEC code if the present performance margin is smaller than the first threshold value.

12. The invention of claim 11, wherein the RCU is further adapted to:
compare the present performance margin with a second threshold value that is greater than the first threshold value; and
increase the rate of the FEC code if the present performance margin is greater than the second threshold value.

13. The invention of claim 1, wherein the RCU is further adapted to:
estimate a respective performance margin for each individual WDM channel used for optical transport between the first and second OTs; and
configure the first and second OTs to use different FEC-code rates for at least two different individual WDM channels based on the respective estimated performance margins.

14. The invention of claim 1, wherein the RCU is further adapted to configure the first and second OTs to change the rate of the FEC code less frequently than once a year.

15. A method of operating an optical transport system, comprising:
estimating a performance margin for an optical link between at least first and second optical transponders (OTs) of a plurality of OTs connected via one or more optical links, wherein the first and second OTs are adapted to communicate with one another using a rate-adaptive forward-error-correction (FEC) code; and
configuring the first and second OTs to change a rate of the FEC code based on the estimated performance margin.

16. The invention of claim 15, further comprising:
determining a bit-error rate (BER) for at least one of the first and second OTs; and
comparing the determined BER with a target BER to estimate the performance margin.

17. The invention of claim 15, further comprising:
predicting the performance margin based on one or more optical characteristics of the optical link between the first and second OTs.

18. The invention of claim 17, wherein the one or more optical characteristics include one or more of:
optical signal-to-noise-ratio after signal transmission through the optical link, wavelength of an optical signal being transmitted through the optical link, amount of chromatic dispersion in the optical link, amount of polarization-mode dispersion in the optical link, optical-channel crosstalk in the optical link, fiber nonlinear penalty in the optical link, and optical filtering penalty in the optical link.

19. The invention of claim 15, further comprising:
configuring the first and second OTs to partition original information data into data tributaries that are compatible with a synchronous optical network (SONET) standard.

20. The invention of claim 15, further comprising:
configuring the first and second OTs to partition original information data into data tributaries that are compatible with an Ethernet standard.

21. The invention of claim 15, further comprising:
comparing a present BER for the communications between the first and second OTs with a target BER to determine a present performance margin;
comparing the present performance margin with at least a first threshold value; and
reducing the rate of the FEC code if the present performance margin is smaller than the first threshold value.

22. The invention of claim 21, further comprising:
comparing the present performance margin with a second threshold value; and
increasing the rate of the FEC code if the present performance margin is greater than the second threshold value.

23. The invention of claim 15, further comprising:
estimating a respective performance margin for each individual WDM channel used for optical transport between the first and second OTs; and
configuring the first and second OTs to use different FEC-code rates for at least two different individual WDM channels based on the respective estimated performance margins.

24. The invention of claim 15, wherein the step of configuring the first and second OTs to change the rate of the FEC code is performed less frequently than once a year.

* * * * *